United States Patent Office 2,714,652
Patented Aug. 2, 1955

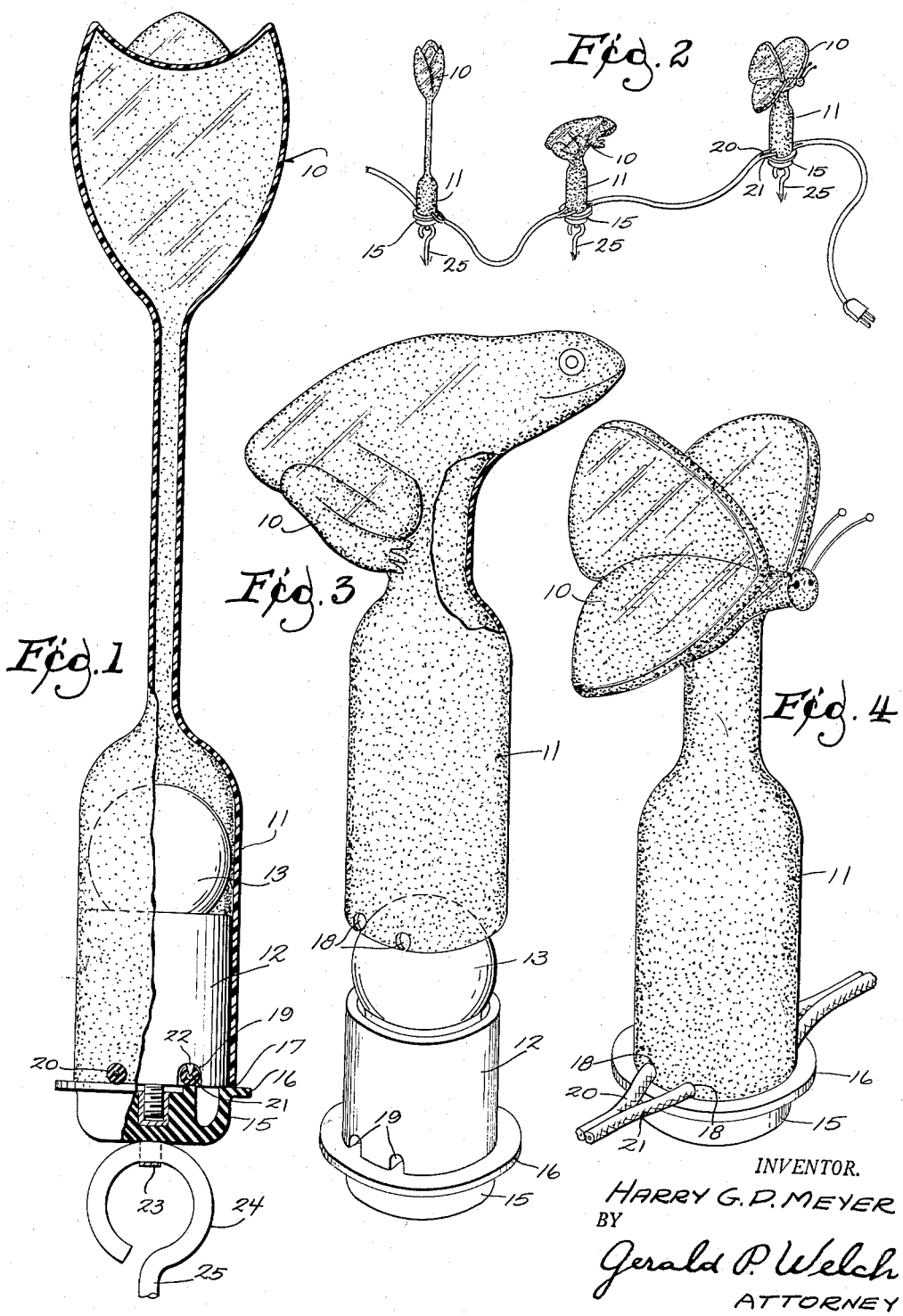

2,714,652
ILLUMINATED GARDEN ORNAMENT ASSEMBLIES

Harry G. P. Meyer, Milwaukee, Wis.

Application August 18, 1952, Serial No. 305,006

2 Claims. (Cl. 240—10)

This invention relates to improvements in illuminated garden ornaments, and more particularly to a novel illuminated garden ornament assembly on a wire adapted to be connected with the house current.

An object of the invention is to provide devices of the type which may be releasably secured to the ground while connected in parallel along an electrical conduit, comprising translucent illuminated ornaments.

Another object of the invention is to provide devices of the type which will be waterproof and otherwise relatively impervious to the elements.

Other and further objects of the invention will appear as the description proceeds, reference being had to the accompanying drawings, in which:

Fig. 1 is a side view partly in elevation and partly in section of an illuminated garden ornament embodying the invention.

Fig. 2 is a view in elevation of a portion of a typical assembly of said ornament.

Fig. 3 is a perspective view partially broken away of an ornament detached from its related socket.

Fig. 4 is a view in perspective of one form of ornament attached to its socket.

In Fig. 1 is shown one type of ornament 10 formed of plastic, glass or other translucent material which has a hollow cylindrical base as at 11 adapted to tightly engage about the socket 12 provided with light bulb 13 and screwed by threaded means 14 to the cap 15, which latter is provided with an encircling flange at 16 to form a weathertight seal with the lower edge 17 of the cylindrical portion 11.

The cylindrical portion 11 has apertures in its lower edge as at 18 registering with the apertures 19 in the socket 12 which accommodate the wires 20 and 21. The socket 12 is provided with metal contact points as at 22 which are forced into the wires 20 and 21 when the cap 15 is screwed tightly into contact therewith.

The cap 15 is provided with the spring clip 23 which may be releasably engaged with the eye 24 of the ground engaging spike 25. The spike 25 is formed of metal or other suitable material and may be approximately four inches or more in length to adequately secure the ornament assembly to the ground. The cords 20 and 21 are to be combined as shown and entirely weatherproof. The colored plastic ornaments will have the cylindrical flexible base 11 which fits over the socket 12 approximately 1½ inches to make firm contact with the protruding flange 16 of the base cap 15.

It will be understood that the device is capable of many modifications in structure and design without departing from the spirit of the invention, within the scope of the appended claims.

Having thus described the invention, what is claimed and desired to be secured by Letters Patent of the United States, is:

1. An illuminated garden ornament assembly including an electric wire, cylindrical sockets connected at intervals to said wire, light bulbs held in said sockets, translucent ornaments for said sockets, cylindrical base portions on said ornaments engaged snugly over said sockets, said sockets having horizontal wire passageways, contact points depending downwardly within said sockets, cap means threadingly engaged with said sockets for pressing said contact points into wires held in said passageways, flanges on said caps for sealing the lower edges of said cylindrical base portions, laterally open clips subjoined under said caps, and spike means engaged with said clips subjoined for releasably securing said sockets and cap to the ground.

2. In a device of the character described, a translucent plastic ornament, a hollow cylindrical base thereon, a socket held snugly within said base having horizontal wire passageways therein, said cylindrical base having apertures registering with said passageways, a cap threadedly engaged on the lower end of said socket, an annular flange on said cap bearing against the lower edge of said cylindrical portion, a laterally open clip subjoined under said cap, a spike for securing the device to the ground, and an eye in the head of said spike engaged within said clip.

References Cited in the file of this patent
UNITED STATES PATENTS

| | | |
|---|---|---|
| 322,367 | Georgi | July 14, 1885 |
| 568,592 | Van Riper | Sept. 29, 1896 |
| 791,713 | McCarthy | June 6, 1905 |
| 1,001,843 | Cudeman | Aug. 29, 1911 |
| 1,247,026 | Smith | Nov. 20, 1917 |
| 1,601,677 | Cesareo | Sept. 28, 1926 |
| 1,949,551 | Somervell | Mar. 6, 1934 |
| 2,054,605 | Rogers | Sept. 15, 1936 |
| 2,493,991 | Morrison | Jan. 10, 1950 |
| 2,559,706 | Brooks | July 10, 1951 |
| 2,636,069 | Gilbert | Apr. 21, 1953 |
| 2,642,561 | Judson | June 16, 1953 |
| 2,657,367 | Brooks | Oct. 27, 1953 |
| 2,664,497 | Reynolds | Dec. 29, 1953 |